United States Patent
Chou et al.

(10) Patent No.: US 9,177,190 B1
(45) Date of Patent: Nov. 3, 2015

(54) FINGERPRINT SENSOR MODULE

(71) Applicant: Cheng Uei Precision Industry Co., Ltd., New Taipei (TW)

(72) Inventors: Ssu Hsuan Chou, New Taipei (TW); Nien Ting Weng, New Taipei (TW); Sheng Yuan Lin, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/464,744

(22) Filed: Aug. 21, 2014

(30) Foreign Application Priority Data

May 30, 2014 (TW) .............................. 103119160 A
Jul. 14, 2014 (TW) .............................. 103125010 A

(51) Int. Cl.
*G06K 9/00* (2006.01)
*G06K 9/20* (2006.01)

(52) U.S. Cl.
CPC ............ *G06K 9/00013* (2013.01); *G06K 9/209* (2013.01); *G06K 9/2027* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,002,499 A * | 12/1999 | Corboline et al. | . | G06K 9/00006 356/71 |
| 7,245,745 B2 * | 7/2007 | Nagasaka et al. | ........ | G06K 9/00 382/115 |
| 7,408,135 B2 * | 8/2008 | Fujieda | ................. | G06F 1/1626 250/208.1 |
| 7,787,110 B2 * | 8/2010 | Raguin et al. | ....... | G06K 9/00046 356/71 |
| 7,822,236 B2 * | 10/2010 | Fenrich et al. | ..... | G06K 9/00046 382/124 |
| 8,170,300 B2 * | 5/2012 | Yamamoto et al. | ................. | G06K 9/00013 382/124 |
| 8,284,019 B2 * | 10/2012 | Pishva | ................. | G06K 9/0012 340/5.2 |
| 9,064,139 B2 * | 6/2015 | Fenrich et al. | ..... | G06K 9/00046 |
| 2004/0252867 A1 * | 12/2004 | Lan et al. | ............. | G06K 9/0004 382/124 |
| 2006/0119837 A1 * | 6/2006 | Raguin et al. | ....... | G06K 9/00046 356/71 |
| 2007/0146318 A1 * | 6/2007 | Juh et al. | ................ | G06F 3/0421 345/157 |
| 2009/0016578 A1 * | 1/2009 | Yamamoto et al. | ................. | G06K 9/00013 382/124 |
| 2015/0109214 A1 * | 4/2015 | Shi et al. | ................. | G06F 3/044 345/173 |

* cited by examiner

*Primary Examiner* — Anand Bhatnagar
(74) *Attorney, Agent, or Firm* — Lin & Associates IP, Inc.

(57) ABSTRACT

A fingerprint sensor module includes a lens, a filter, a first reflector, an image capturing module for capturing a first fingerprint image and a second fingerprint image, and at least one first light source for providing the needed light source at the time of the image capturing module capturing the fingerprint image. A top surface and a bottom surface of the lens are planes. The lens defines at least one first area and a second area. The filter is disposed under the lens. The filter is corresponding to the first area of the lens for reflecting the first fingerprint image corresponding to the first area. The first reflector is disposed under the lens. The first reflector is corresponding to the second area of the lens for reflecting the second fingerprint image corresponding to the second area.

11 Claims, 16 Drawing Sheets

FINGERPRINT SENSOR MODULE

CROSS-REFERENCE TO RELATED APPLICATION

The present application is based on, and claims priority form, Taiwan Patent Application No. 103119160, filed May 30, 2014, and Taiwan Patent Application No. 103125010, filed Jul. 21, 2014, the disclosure of which is hereby incorporated by reference herein in its entirety.

BACKGROUND OF THE INVENTION

1. Field of the Invention

The present invention generally relates to a fingerprint sensor module, and more particularly to an optical fingerprint sensor module.

2. The Related Art

Currently, optical fingerprint sensor modules and capacitive fingerprint sensor modules are mainstream products of fingerprint sensor modules on the market. In general, the high-density capacitive fingerprint sensor module is integrated into a chip. When a fingerprint is pressed downward on a surface of the chip, the capacitive fingerprint sensor module senses a fingerprint image through different quantities of electric charge of fingerprint peaks and troughs. The advantage of the capacitive fingerprint sensor module is thinness. But the capacitive fingerprint sensor module has a higher cost, a lower sensing accuracy and a lower durability.

The optical fingerprint sensor module captures the fingerprint image by the principle of imaging. Comparing with the capacitive fingerprint sensor module, the optical fingerprint sensor module has the advantages of higher identification, lower price and better durability. But the imaging system needs to keep a distance from the lens to the sensor to form the fingerprint image clearly. The imaging light path makes a size of the optical fingerprint sensor module become larger and thicker.

Due to a current electronic product being developed towards the trend of thinness, factories wish to manufacture the optical fingerprint sensor modules of which each has a thinner structure one after another for being appropriate to internal structures of the thinner electronic products.

The current optical fingerprint sensor module shortens the straight distance between the sensor and the lens to reduce the thickness of the optical fingerprint sensor module by an imaging light path refracted by a prism. For example, U.S. Pat. No. 8,405,757 discloses a conventional embodiment where a component pressed by the fingerprint is the prism. Through a refraction characteristic of a light the fingerprint image is formed by a prism. It makes the fingerprint image be formed through a total internal reflection light path by the prism to the lens.

In other conventional technology, in order to satisfy the thinness need, the difference is that some is commenced from a structure of the special lens, or a variety of lenses with complex structures are designed to reduce the thickness of the optical fingerprint sensor module for increasing a possibility of being applied in a cell phone or a tablet computer.

However, a structure of the refraction path of the current optical fingerprint sensor module is complex that makes the cost of the fingerprint sensor module is higher and the thickness of the optical fingerprint sensor module has no way of being less than 6.5 mm. Thus, it's difficult to manufacture the current optical fingerprint sensor module in mass production.

In view of this, it's essential to provide an optical fingerprint sensor module with a simple structure, a lower cost and a thickness of being less than 6.5 mm.

SUMMARY OF THE INVENTION

An object of the present invention is to provide a fingerprint sensor module. The fingerprint sensor module includes a lens, a filter, a first reflector, an image capturing module for capturing the first fingerprint image corresponding to the first area and reflected by the filter, and the second fingerprint image corresponding to the second area and reflected by the first reflector, and at least one first light source for providing the needed light source at the time of the image capturing module capturing the fingerprint image. The top surface and the bottom surface of the lens are planes. The lens defines at least one first area and a second area. The filter is disposed under the lens. The filter is corresponding to the first area of the lens for reflecting a first fingerprint image corresponding to the first area. The first reflector is disposed under the lens. The first reflector is corresponding to the second area of the lens for reflecting a second fingerprint image corresponding to the second area. The filter is disposed between the first reflector and the first image capturing module. The first fingerprint image corresponding to the first area is reflected by the filter to be captured by the image capturing module, and the second fingerprint image corresponding to the second area is reflected by the first reflector and then penetrates through the filter to be captured by the image capturing module.

As described above, a reflected light path of the first reflector is without a limitation of being blocked by the filter through a characteristic of the filter so as to make the first fingerprint image and the second fingerprint image captured by the same image capturing module, because components for being used to reflect the light path are less and the lens is cheaper. So that the structure of the fingerprint sensor module is simplified, the cost is lowered and the thickness can reach the requirement of being less than 6.5 mm. Thus, it's apt to manufacture the fingerprint sensor module in mass production.

BRIEF DESCRIPTION OF THE DRAWINGS

This present invention will be apparent to those skilled in the art by reading the following description, with reference to the attached drawings, in which.

DETAILED DESCRIPTION OF THE EMBODIMENT

Figure 1:
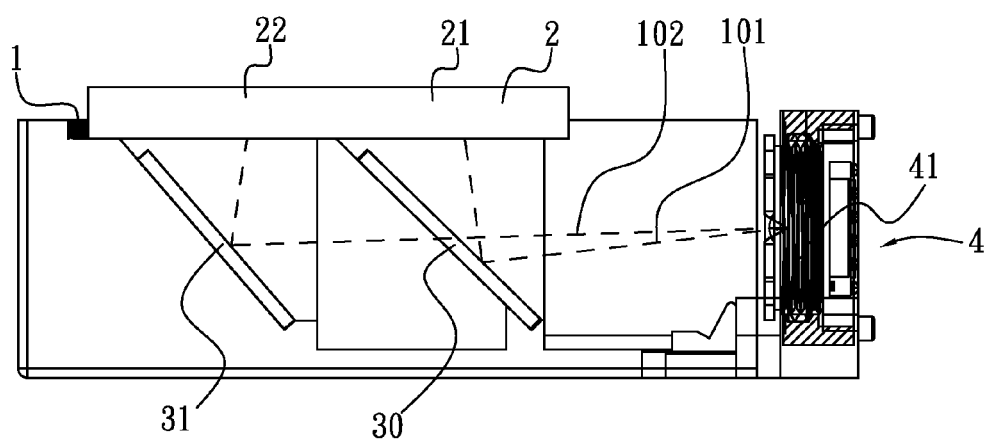
FIG. 1 is a lateral sectional view of a fingerprint sensor module according to a first embodiment of the present invention.

Referring to FIG. 1 to FIG. 16, an optical fingerprint sensor module 100 in accordance with the present invention is shown. The fingerprint sensor module 100 is adapted for being assembled to an electronic module (not shown) for forming a fingerprint image. The fingerprint sensor module 100 includes an image capturing module 4. The image capturing module 4 is designated as a first image capturing module 41, a second image capturing module 42, a third image capturing module 43 and a fourth image capturing module 44.

Referring to FIG. 1 to FIG. 4, the fingerprint sensor module 100 according to a first embodiment of the present invention, includes at least one first light source 1, a lens 2, a filter 30, a first reflector 31 and the first image capturing module 41. The first light source 1 is disposed to one side of the lens 2, and a light ray of the first light source 1 penetrates into the lens 2 from the side of the lens 2 adjacent to the first light source 1. The filter 30 and the first reflector 31 are disposed under the lens 2. The first image capturing module 41 is used for capturing a fingerprint image reflected by the filter 30 and the first reflector 31. The lens 2 is made of glass or transparent plastic, and a top surface and a bottom surface of the lens 2 are planes.

Referring to FIG. 1, the first light source 1 irradiates the lens 2 from the side of the lens 2 adjacent to the first light source 1. After the first light source 1 penetrates into the lens 2, the light from the first light source 1 is totally reflected in the lens 2 according to the total reflection law. When a finger is pressed downward upon the top surface of the lens 2, fingerprint peaks destroy the total reflection of the first light source 1 in the lens 2 and generate the fingerprint image. The first image capturing module 41 captures a high-contrast pattern of the fingerprint image through the first light source 1 irradiating the lens 2 from the side of the lens 2 adjacent to the first light source 1.

Figure 2:
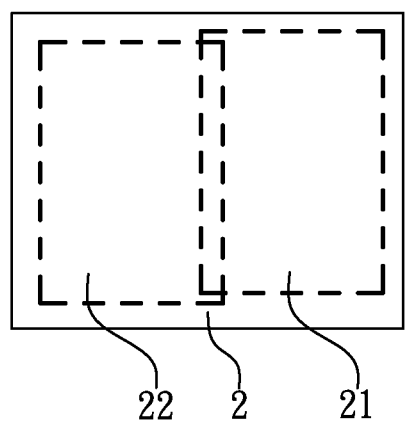
FIG. 2 is a vertical view of a lens of the fingerprint sensor module according to the present invention, wherein a first area and a second area of the flat lens are partially overlapped.

Referring to FIG. 1 and FIG. 2, the lens 2 defines at least one first area 21 and a second area 22. The filter 30 is corresponding to the first area 21 of the lens 2 for reflecting a first fingerprint image corresponding to the first area 21, and the first reflector 31 is corresponding to the second area 22 of the lens 2 for reflecting a second fingerprint image corresponding to the second area 22. The first image capturing module 41, is used for capturing the first fingerprint image corresponding to the first area 21 and reflected by the filter 30, and the second fingerprint image corresponding to the second area 22 and reflected by the first reflector 31. The first area 21 and the second area 22 are used for being pressed downward upon, and the complete fingerprint image is divided into a first fingerprint image corresponding to the first area 21 and a second fingerprint image corresponding to the second area 22. When the finger is pressed downward upon the top surface of the lens 2, and after the lens 2 receives the irradiation of the first light source 1, the first area 21 and the second area 22 of the lens 2 will respectively generate the first fingerprint image and the second fingerprint image for being captured by the first image capturing module 41. The first fingerprint image and the second fingerprint image captured by the first image capturing module 41 are spliced together to form the complete fingerprint image by virtue of an image processing software.

Referring to FIG. 1, the first image capturing module 41 captures the first fingerprint image corresponding to the first area 21 and the second fingerprint image corresponding to the second area 22 reflected by the filter 30 and the first reflector 31. The filter 30 is disposed between the first reflector 31 and the first image capturing module 41. The first fingerprint image corresponding to the first area 21 is reflected by the filter 30 to be captured by the first image capturing module 41, and the second fingerprint image corresponding to the second area 22 is reflected by the first reflector 31 and then penetrates through the filter 30 to be captured by the first image capturing module 41.

Referring to FIG. 1 and FIG. 2, in order to increase an identification of the image processing software for the first fingerprint image and the second fingerprint image. The first area 21 and the second area 22 of the lens 2 are partially overlapped to make the first fingerprint image corresponding to the first area 21 and the second fingerprint image corresponding to the second area 22 be partially the same. So the first fingerprint image corresponding to the first area 21 and the second fingerprint image corresponding to the second area 22 have the same image sections. The first fingerprint image corresponding to the first area 21 and the second fingerprint image corresponding to the second area 22 captured by the first image capturing module 41 have the same image sections so that the first fingerprint image and the second fingerprint image are spliced together to form the complete fingerprint image by virtue of the image processing software identifying the same image sections of the first fingerprint image and the second fingerprint image.

Figure 3:
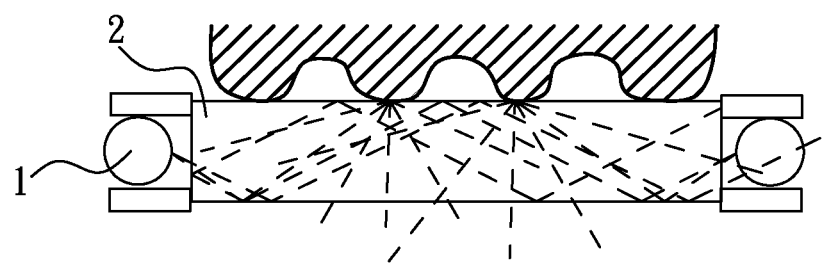
FIG. 3 is a schematic diagram of the fingerprint sensor module according to the present invention, wherein the light emitted from light source will be totally reflected in the lens, however the finger touching the lens will destroy the totally reflection, and let the light penetrate the bottom surface of the lens.
Figure 4:
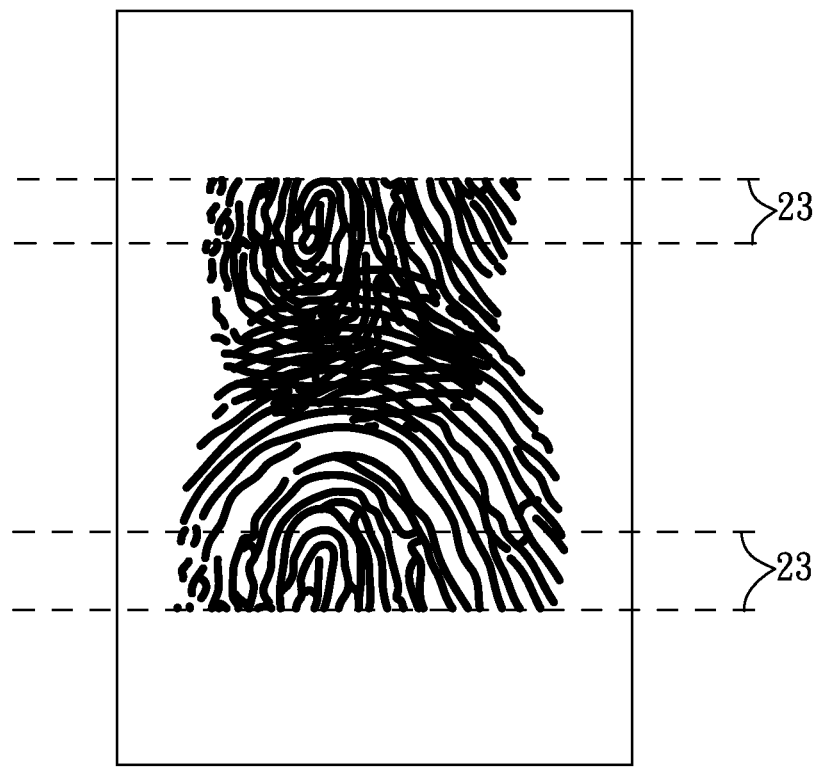
FIG. 4 is a schematic diagram of a first fingerprint image corresponding to the first area and a second fingerprint image corresponding to the second area captured by an image capturing module of the fingerprint sensor module according to the present invention, wherein patterns of the first fingerprint image and the second fingerprint image have different sizes and are partially overlapped.

Referring to FIG. 1 and FIG. 3, the image generated by the first light source 1 totally reflected in the lens 2 is different from the image with black lines generated by a general prism through the fingerprint peaks absorbing the light of the first light source 1. When the light of the first light source 1 is totally reflected in the lens 2, the totally reflected light of the first light source 1 has no way of penetrating through the bottom surface of the lens 2. So the first image capturing module 41 will never receive the first light source 1 until the fingerprint peaks are pressed downward upon the top surface of the lens 2. The fingerprint peaks destroy the total reflection to make the light of the first light source 1 be scattered and penetrate through the bottom surface of the lens 2 so as to be received by the first image capturing module 41. So the first image capturing module 41 never receives the light of the first light source 1 without a portion of the lens 2 being pressed, and the first image capturing module 41 receives the light of the first light source 1 with a portion of the lens 2 being pressed to form the bright fingerprint image for achieving the function of improving the image contrast.

The first light source 1 of the fingerprint sensor module 100 is not limited to be disposed to the side of the lens 2. The first light source 1 is used for providing the needed lighting at the time of the first image capturing module 41 capturing the fingerprint image. The position of the first light source 1 is disposed to make the fingerprint have the enough light enter the first image capturing module 41.

Referring to FIG. 1, FIG. 2 and FIG. 4 again, a length of the light path between the first area 21 and the first image capturing module 41 is different from a length of a light path between the second area 22 and the first image capturing module 41. The light path between the first area 21 and the first image capturing module 41 defines as a first light path 101. The light path between the second area 22 and the first image capturing module 41 defines as a second light path 102. The first light path 101 is shorter than the second light path 102. The first fingerprint image corresponding to the first area 21 and the second fingerprint image corresponding to the second area 22 captured by the first image capturing module 41 have different sizes. The first light path 101 and the second light path 102 are overlapped, so the first fingerprint image corresponding to the first area 21 and the second fingerprint image corresponding to the second area 22 are overlapped.

Referring to FIG. 1 to FIG. 4, in order to conquer the problems of the first fingerprint image and the second fingerprint image being overlapped, in the first embodiment, the first image capturing module 41 is a zoom lens image capturing module or an auto-focus image capturing module. Thereby, when the first image capturing module 41 is adjusted to a focal length of the first light path 101, the first fingerprint image corresponding to the first area 21 formed clearly and the second fingerprint image corresponding to the second area 22 formed vaguely. When the first image capturing module 41 is adjusted to a focal length of the second light path 102, the second fingerprint image corresponding to the second area 22 formed clearly and the first fingerprint image corresponding to the first area 21 formed vaguely. So the first image capturing module 41 captures the clear first fingerprint image corresponding to the first area 21 and the clear second fingerprint image corresponding to the second area 22 by virtue of the image processing software. Then the complete fingerprint image is formed by virtue of the image processing software zooming and splicing together the first fingerprint image corresponding to the first area 21 and the second fingerprint image corresponding to the second area 22 for accomplishing identifying the fingerprint.

Referring to FIG. 1 to FIG. 4, in the first embodiment, the filter 30 is a polarized spectral filter or a dichroic filter, or a filter of reflecting some light rays and some other light rays penetrating therethrough to make the filter achieve the function of reflecting some specific light rays and some other specific light rays penetrating therethrough. Preferably, the first light source 1 is the white light source.

Figure 5:
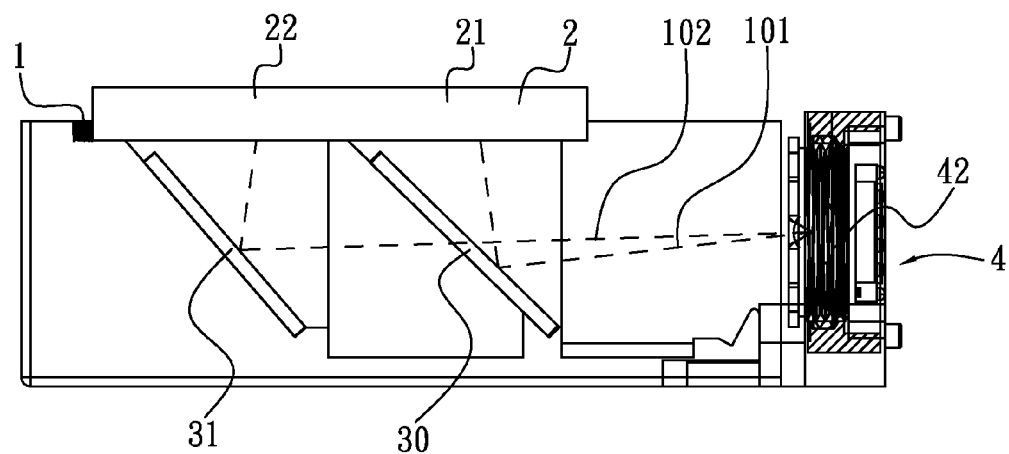
FIG. 5 is a lateral sectional view of the fingerprint sensor module according to a second embodiment of the present invention.

Referring to FIG. 5, the fingerprint sensor module 100 in accordance with a second embodiment of the present invention is shown. A structure of the fingerprint sensor module 100 in accordance with the second embodiment is nearly the same as that of the fingerprint sensor module 100 in accordance with the first embodiment. The differences between the fingerprint sensor module 100 in accordance with the first embodiment and the fingerprint sensor module 100 in accordance with the second embodiment are described as follows. The fingerprint sensor module 100 in accordance with the second embodiment further includes the second image capturing module 42. The first light source 1 is the white light source, or the first light source 1 includes the compositions of being able to be reflected by the dichroic filter and penetrate through the dichroic filter. The filter 30 is the dichroic filter. A length of depth of field of the second image capturing module 42 includes a length difference between the first light path 101 and the second light path 102, and the second image capturing module 42 has no need of zooming.

Referring to FIG. 5 again, specifically, when the first light source 1 is a white light source, the filter 30 has the function of reflecting green light and blue light penetrating therethrough. The first light path 101 hits the filter 30 and reflects the green light, and the blue light of the second light path 102 penetrates through the filter 30. Thereby, the first fingerprint image and the second fingerprint image captured by the second image capturing module 42 will respectively appear green and blue to zoom and splice together the first fingerprint image and the second fingerprint image by virtue of the image processing software identifying the colors of the first fingerprint image and the second fingerprint image and separating the first fingerprint image from the second fingerprint image which are overlapped.

Figure 6:
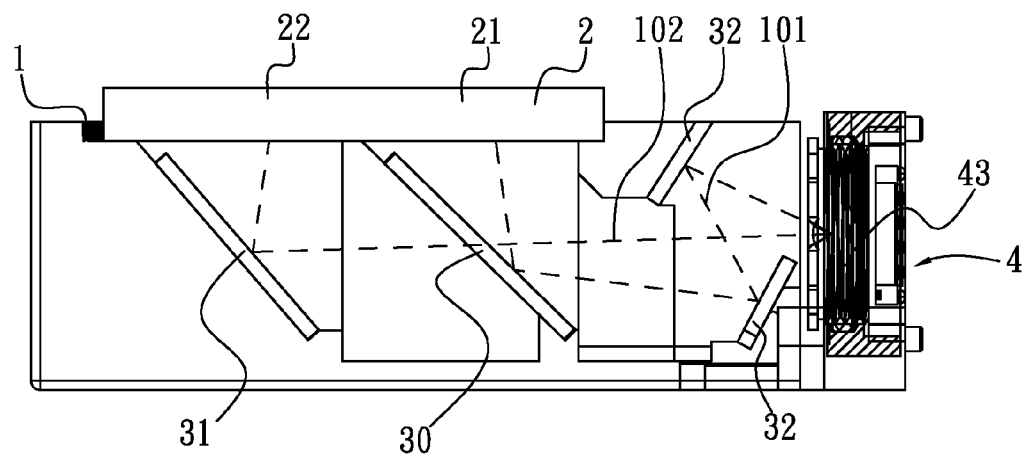
FIG. 6 is a lateral sectional view of the fingerprint sensor module according to a third embodiment of the present invention.

Referring to FIG. 6, the fingerprint sensor module 100 in accordance with a third embodiment of the present invention is shown. A structure of the fingerprint sensor module 100 in accordance with the third embodiment is nearly the same as that of the fingerprint sensor module 100 in accordance with the first embodiment. Differences between the fingerprint sensor module 100 in accordance with the first embodiment and the fingerprint sensor module 100 in accordance with the third embodiment are described as follows. The fingerprint sensor module 100 in accordance with the third embodiment further includes the third image capturing module 43. The third image capturing module 43 has no need of zooming, and the length of depth of field of the third image capturing module 43 is shorter than the first image capturing module 41, and the first light path 101 between the filter 30 and the third image capturing module 43 is reflected by at least one second reflector 32. A length of the first light path 101 is longer by virtue of the first light path 101 being reflected by the second reflector 32, and the length of the first light path 101 is adjusted to be the same as that of the second light path 102 so as to make the sizes of the first fingerprint image and the second fingerprint image captured by the third image capturing module 43 be the same.

Referring to FIG. 6 again, in the third embodiment, the lengths of the first light path 101 and the second light path 102 are the same, so the depth of field of the third image capturing module 43 is shorter to be beneficial for choosing the third image capturing module 43 with a smaller volume.

Figure 7:
FIG. 7 is a schematic diagram of the first fingerprint image and the second fingerprint image captured by the image capturing module of the fingerprint sensor module according to the third embodiment of the present invention, wherein the patterns of the first fingerprint image and the second fingerprint image have the same sizes and are apart from each other.

Referring to FIG. 6 and FIG. 7, the first fingerprint image and the second fingerprint image captured by the third image capturing module 43 will be never overlapped by virtue of the second reflector 32, thereby, the first fingerprint image and the second fingerprint image captured by the third image capturing module 43 are spliced together by the image processing software for forming the complete fingerprint image.

Referring to FIG. 6 and FIG. 7 again, the reason why the first fingerprint image and the second fingerprint image captured by the third image capturing module 43 are never overlapped is that the incident angle of the first light path 101 is different from that of the second light path 102.

Referring to FIG. 6, the first light path 101 is reflected twice by the two second reflectors 32 to be beneficial for controlling the light path thereof to make the position of the third image capturing module 43 more flexible. The third image capturing module 43 is located within a height of an occupied space of the filter 30 and the first reflector 31 to make the fingerprint sensor module 100 thinner.

Referring to FIG. 1, FIG. 5 and FIG. 6, comparing with the first image capturing module 41, the second image capturing module 42 and the third image capturing module 43, the first image capturing module 41 captures the first fingerprint image and the second fingerprint image respectively corresponding to the first light path 101 and the second light path 102 by virtue of utilizing the zoom way or auto-focusing. The depth of field of the second image capturing module 42 is wider and covers the length difference between the first light path 101 and the second light path 102. In the third embodiment, because the length of the first light path 101 is the same as that of the second light path 102, a scope of the depth of field of the third image capturing module 43 is shorter than the second image capturing module 42. It also has no need of zooming. The volume of the third image capturing module 43 is smaller than the second image capturing module 42.

Figure 8:
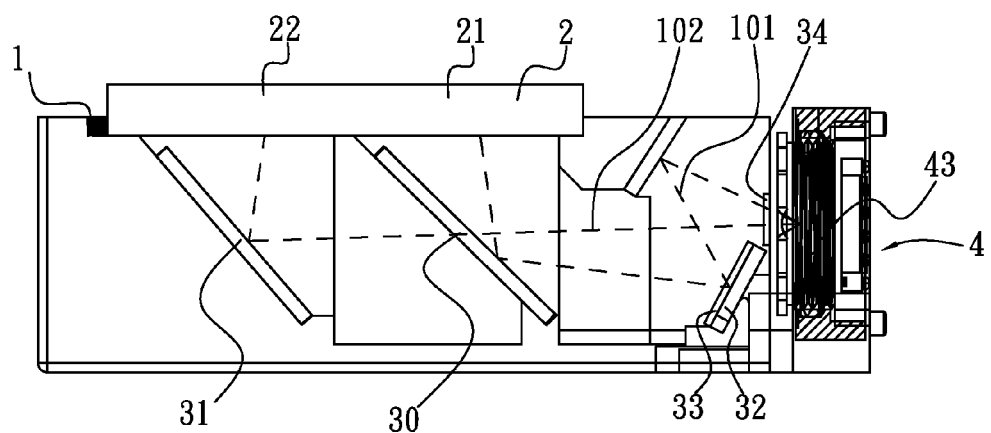
FIG. 8 is a lateral sectional view of the fingerprint sensor module according to a fourth embodiment of the present invention.

Referring to FIG. 8, the fingerprint sensor module 100 in accordance with a fourth embodiment of the present invention is shown. A structure of the fingerprint sensor module 100 in accordance with the fourth embodiment is nearly the same as that of the fingerprint sensor module 100 in accordance with the third embodiment. Differences between the fingerprint sensor module 100 in accordance with the third embodiment and the fingerprint sensor module 100 in accordance with the fourth embodiment are described as follows. The filter 30 is the polarizing beam splitter. The fingerprint sensor module 100 in accordance with the fourth embodiment further includes a polarization rotator 33 and an additional polarizing filter 34. Usually we call this additional polarizing filter 34 as analyzer 34. The first light path 101 between the filter 30 and the third image capturing module 43 penetrates through the polarization rotator 33 for changing polarized directions. The polarization rotator 33 is adhered to one of the second reflector 32. The analyzer 34 is located in front of the third image capturing module 43. The first light source 1 should have the compositions of S wave and P wave.

Referring to FIG. 8 again, the filter 30 has the function of reflecting S wave and P wave penetrating therethrough. The analyzer 34 has the function of absorbing the S wave and the P wave penetrating therethrough or reflecting the S wave and the P wave penetrating therethrough. All the light rays received by the third image capturing module 43 penetrate through the analyzer 34. The S wave components of the first light path 101 will be reflected by the filter 30, and the P wave components of the second light path 102 will penetrate through the filter 30. The second light path 102 is able to penetrate through the analyzer 34. After the first light path 101 penetrates through the polarization rotator 33, the S wave is changed to the P wave so as to be able to penetrate through the analyzer 34. Thereby, the first fingerprint image and the second fingerprint image are captured by the third image capturing module 43. The first fingerprint image and the second fingerprint image are spliced together to form the complete fingerprint image by virtue of the image processing software.

Figure 9:
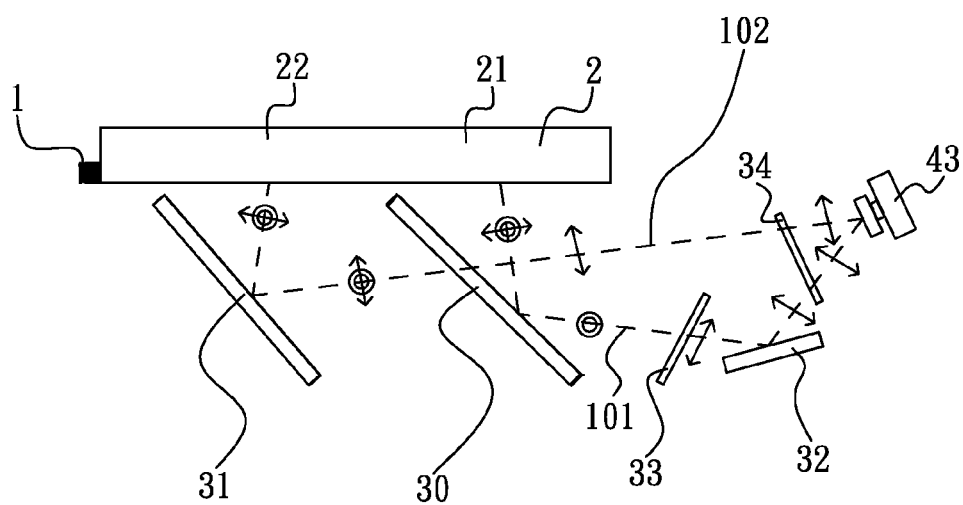
FIG. 9 is a schematic diagram of a first light path and a second light path of the fingerprint sensor module according to the fourth embodiment of the present invention.
Figure 10:
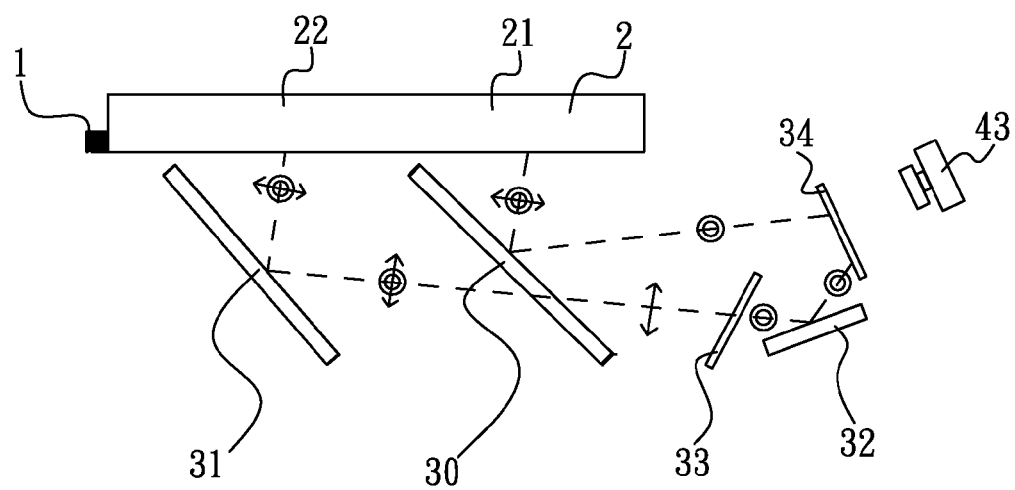
FIG. 10 is a schematic diagram of a light path of a noise of the fingerprint sensor module according to the fourth embodiment of the present invention.

Referring to FIG. 9 and FIG. 10, the first light path 101 and the second light path 102 will penetrate through the analyzer 34 in the P wave form to enter the third image capturing module 43, but, besides the first light path 101 and the second light path 102 being going to enter the third image capturing module 43, in addition, a part of light reflected by the filter 30 is directly reflected to the third image capturing module 43 without passing through the second reflector 32 on account of the reflecting angle relation to shorten the first light path 101 to generate a noise. Before the noise arrives at the third image capturing module 43, the noise is the S wave (concentric circle pattern), so the noise is filtered, and another image light source is reflected by the first reflector 31 to the second reflector 32 without being captured by the third image capturing module 43 to lengthen the second light path 102 to generate the noise. The second light path 102 shows the P wave at the time of passing through the filter 30, and is changed to the S wave after passing through the polarization rotator 33, so the second light path 102 is filtered. Thus, it's able to prevent interferences of noise image light sources for improving an imaging quality through the polarized spectral principle and the polarization direction principle.

Figure 11:
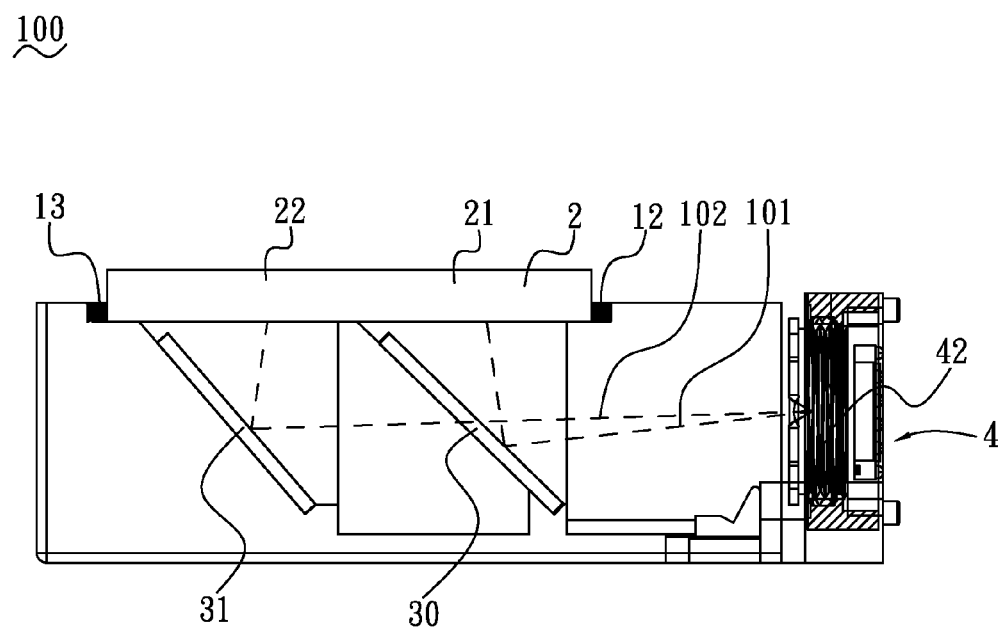
FIG. 11 is a lateral sectional view of the fingerprint sensor module according to a fifth embodiment of the present invention.

Referring to FIG. 11, the fingerprint sensor module 100 in accordance with a fifth embodiment of the present invention is shown. A structure of the fingerprint sensor module 100 according to the fifth embodiment is nearly the same as that of the fingerprint sensor module 100 according to the first embodiment. Differences between the fingerprint sensor module 100 according to the first embodiment and the fingerprint sensor module 100 according to the fifth embodiment are described as follows. The first light source 1 is replaced by at least one second light source 12 and at least one third light source 13. The second light source 12 irradiates the first area 21, and the third light source 13 irradiates the second area 22. The colors of the second light source 12 and the third light source 13 are different. In the fifth embodiment, the second image capturing module 42 captures the first and second fingerprint images with the different colors.

Referring to FIG. 11, the filter 30 is the polarizing beam splitter or the dichroic filter, or a filter of reflecting some light rays and some other light rays penetrating therethrough. It need be noted that, the second light source 12 should contain the composition of being able to be reflected by the dichroic filter, and the third light source 13 should contain the composition of being able to penetrate through the dichroic filter.

Referring to FIG. 11 again, specifically, the second light source 12 and the third light source 13 are the green light and the blue light. The filter 30 has the function of reflecting some light with the certain intensity and others penetrating therethrough. Thereby, the first fingerprint image and the second fingerprint image captured by the second image capturing module 42 will respectively show green and blue to accelerate a processing speed of splicing by virtue of the image processing software identifying the colors of the first fingerprint image and the second fingerprint image. The image processing software is able to separate the first fingerprint image from the second fingerprint image according to the colors and splicing together the first fingerprint image and the second fingerprint image to get the complete fingerprint image.

Figure 12:
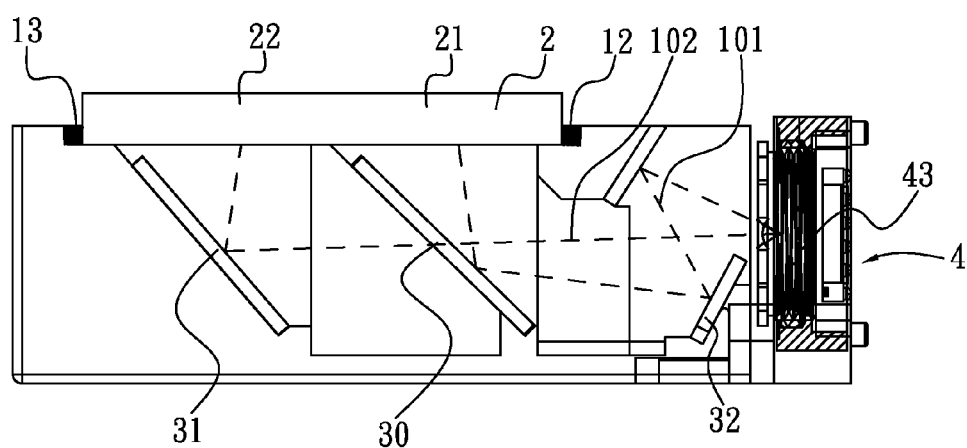
FIG. 12 is a lateral sectional view of the fingerprint sensor module according to a sixth embodiment of the present invention.

Referring to FIG. 12, the fingerprint sensor module 100 in accordance with the sixth embodiment of the present invention is shown. A structure of the fingerprint sensor module 100 according to the sixth embodiment is the same as that of the fingerprint sensor module 100 according to the fifth embodiment. Differences between the fingerprint sensor module 100 according to the fifth embodiment and the fingerprint sensor module 100 according to the sixth embodiment are described as follows. The image capturing module 4 is the third image capturing module 43. The first light path 101 between the filter 30 and the third image capturing module 43 is reflected by the second reflector 32 to make the size of the first fingerprint image captured by the third image capturing module 43 is the same as that of the second fingerprint image captured by the third image capturing module 43. The second light source 12 and the third light source 13 respectively make the third image capturing module 43 capture the first and second fingerprint images with the different colors.

Referring to FIG. 12, the third image capturing module 43 captures the first fingerprint image and the second fingerprint image with the different colors. The first fingerprint image and the second fingerprint image captured by the third image capturing module 43 will never be overlapped. Thereby, the first fingerprint image and the second fingerprint image captured by the third image capturing module 43 are spliced together by virtue of the image processing software to form the complete fingerprint image. Through forming the first and second fingerprint images with the different colors, it can prevent generating the noise image.

Figure 13:
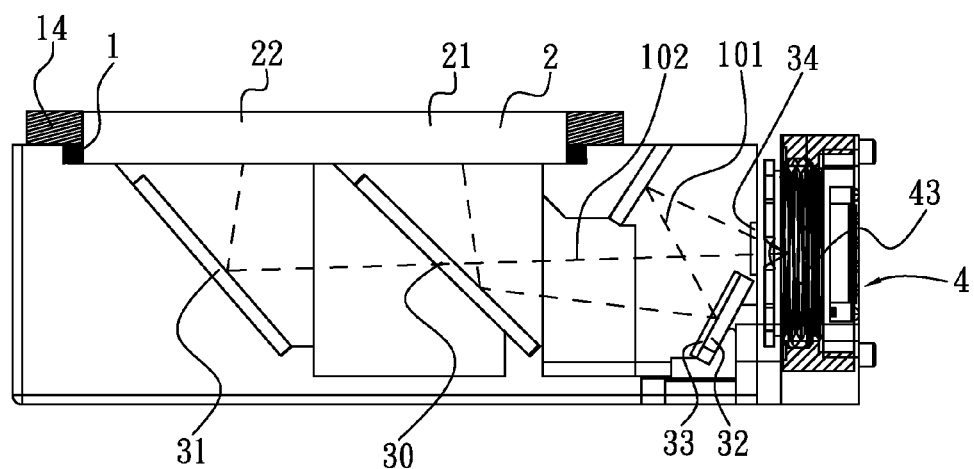
FIG. 13 is a lateral sectional view of the fingerprint sensor module according to a seventh embodiment of the present invention.

Referring to FIG. 13, the fingerprint sensor module 100 in accordance with a seventh embodiment of the present invention is shown. In order to increase a liveness detection ability of the fingerprint sensor module 100, a structure of the fingerprint sensor module 100 according to the seventh embodiment is one of the structures of the fingerprint sensor module 100 according to the first embodiment to the sixth embodiment. At least one fourth light source 14 is disposed to a periphery of a top of the lens 2. The fourth light source 14 irradiates the finger to be provided for the third image capturing module 43 to record a scene video. Because the intensity of the reflected light source will be changed at the time of blood flowing in the finger, the third image capturing module 43 gets a variation of photoplethysmograph signal for identifying vital signs. Thus, under the current structure, the liveness detection ability of the fingerprint sensor module 100 according to the seventh embodiment is realized by the fourth light source 14 for improving the liveness detection ability of the fingerprint sensor module 100 according to the seventh embodiment.

Figure 14:
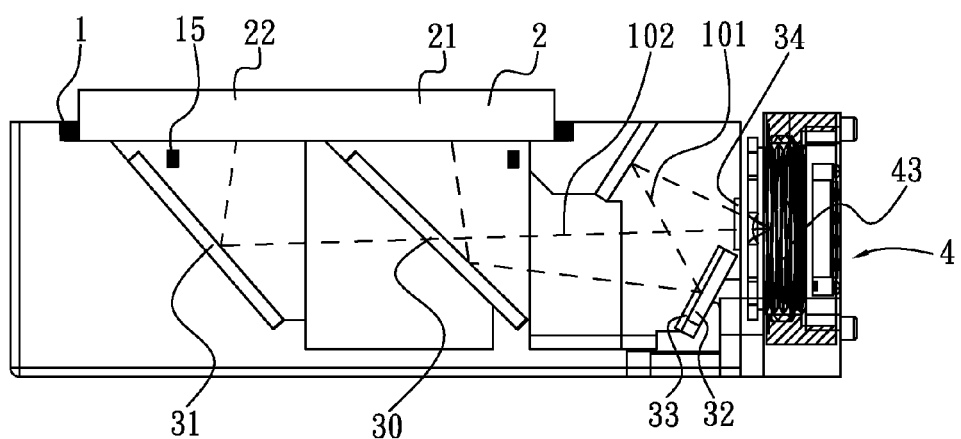
FIG. 14 is a lateral sectional view of the fingerprint sensor module according to an eighth embodiment of the present invention.
Figure 16:
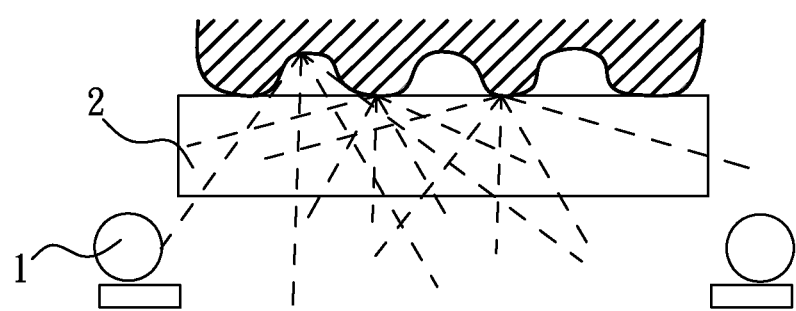
FIG. 16 is a schematic diagram of the fingerprint sensor module according to the present invention, wherein the light emitted from light source penetrates through a surface of the lens, then is reflected by the finger.

Referring to FIG. 14 and FIG. 16, the fingerprint sensor module 100 in accordance with an eighth embodiment of the present invention is shown. In order to increase the liveness detection ability of the fingerprint sensor module 100 according to the eighth embodiment, a structure of the fingerprint sensor module 100 according to the eighth embodiment is one of the structures of the fingerprint sensor modules 100 according to the first embodiment to the sixth embodiment. At least one near-infrared light source 15 is disposed under the bottom surface of the lens 2 to make the blood of the finger vein reflect the near-infrared light source 15 with the wavebands of 800~850 nm, the near-infrared light source 15 irradiates the finger vein for the third image capturing module 43 recording the scene video so as to observe blood changes of the finger vein for recognizing the vital signs, so under the current structure of the fingerprint sensor module 100 according to the eighth embodiment, the identification function of the vein image can be realized by setting the near-infrared light source 15 for improving the identification ability of the fingerprint sensor module 100 according to the eighth embodiment.

Figure 15:
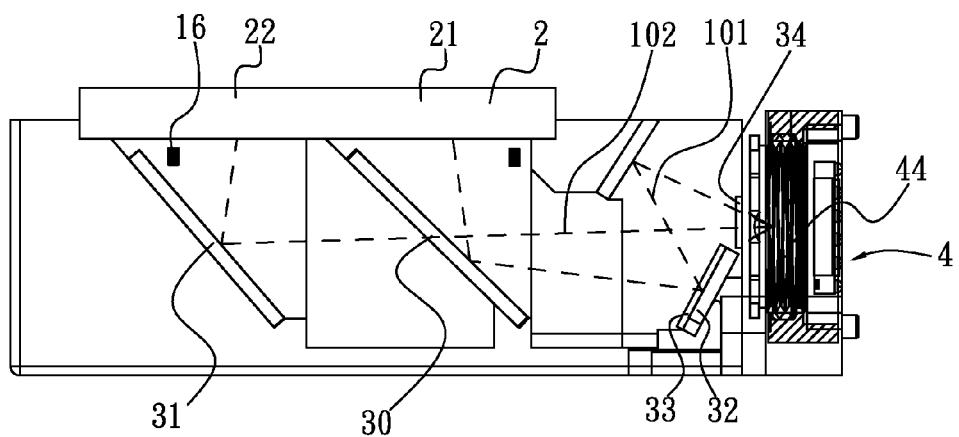
FIG. 15 is a lateral sectional view of the fingerprint sensor module according to a ninth embodiment of the present invention.

Referring to FIG. 15 and FIG. 16, the fingerprint sensor module 100 in accordance with the ninth embodiment of the present invention is shown. A structure of the fingerprint sensor module 100 according to the ninth embodiment is nearly the same as that of fingerprint sensor module 100 according to the fourth embodiment. The fingerprint sensor module 100 according to the ninth embodiment, includes at least one infrared light source 16 and the fourth image capturing module 44. The first light source 1 is replaced by the infrared light source 16. The infrared light source 16 is disposed under the bottom surface of the lens 2. The fourth image capturing module 44 is an infrared camera. After the infrared light source 16 penetrates into the lens 2, the infrared light source 16 is totally reflected and penetrates through the top surface of the lens 2 to irradiate the finger to make the bottom surface of the lens 2 generate the fingerprint image. A finger image pattern, the fingerprint pattern and a pattern of internal tissues of the finger are capable of being captured by the infrared camera 42 in accordance with the ninth embodiment of the present invention.

Referring to FIG. 15 and FIG. 16, after the infrared light source 16 irradiates the lens 2, the infrared light source 16 is partially totally reflected, and partially penetrates through the top surface of the lens 2 to irradiate the finger. When the finger is pressed downward upon the top surface of the lens 2, the fourth image capturing module 44, besides capturing the image of the infrared light source 16 reflected by the original fingerprint peaks, also captures the image of the infrared light source 16 irradiating the finger, so that the fourth image capturing module 44 is used for forming the image of the internal tissues of the finger, such as blood vessels, so a full view of the finger is capable of being observed.

Referring to FIG. 1 to FIG. 16, comparing with the prior art, the components pressed by the fingerprint choose the lens 2 to replace the prism, the prism in prior art need be equipped with a refracting surface for refracting the light source to make the light source in the prism refracted by the refracting surface to shot out from a base body of the prism, a size of the refracting surface is limited by the size of the image, a height of the refracting surface is limited by a refracting angle, so that the refracting surface limits a basic height of the prism, the lens 2 just has the plane top surface and bottom surface, so the thickness of the lens 2 can be designed thinner through the above-mentioned structure.

Referring to FIG. 1 to FIG. 16, the fingerprint image 100 according to the present invention chooses the first reflector 31 and the second reflector 32 respectively corresponding to a part of the bottom surface of the lens 2 to replace the prism in prior art. The prism in prior art need form the complete fingerprint image so that a size of the prism in prior art is limited, because the first reflector 31 and the second reflector 32 respectively need form the first fingerprint image and the second fingerprint image, the sizes of the first reflector 31 and the second reflector 32 can be reduced. If the prism in prior art is larger, it makes a height of the fingerprint sensor module 100 higher. So comparing with the prism in prior art, heights of the first reflector 31 and the second reflector 32 are lower than the prism in prior art.

Referring to FIG. 1 to FIG. 16, a reflected light path of the first reflector 31 is without a limitation of being blocked by the filter 30 through a characteristic of the filter 30 so as to make the first fingerprint image corresponding to the first area 21 and the second fingerprint image corresponding to the second area 22 captured by the same image capturing module 4, because components for being used to reflect the light path are less and the lens 2 is cheaper, so that the structure of the fingerprint sensor module 100 is simplified and a cost of the fingerprint sensor module 100 is lowered.

Referring to FIG. 1 to FIG. 16, the identification degree of the fingerprint sensor module 100 is higher, and the thickness of the fingerprint sensor module 100 effectively reaches a requirement of being less than 6.5 mm through the above-mentioned structure, so the fingerprint sensor module 100 is appropriate for being applied in a thinner-type electronic product.

As described above, the reflected light path of the first reflector 31 is without the limitation of being blocked by the filter 30 through the characteristic of the filter 30 so as to make the first fingerprint image and the second fingerprint image captured by the same image capturing module 4, because the components for being used to reflect the light path are less and the lens 2 is cheaper, so that the structure of the fingerprint sensor module 100 is simplified so that the cost of the fingerprint sensor module 100 is lowered and the thickness of the fingerprint sensor module 100 effectively reaches the requirement of being less than 6.5 mm. Thus, it's apt to manufacture the fingerprint sensor module 100 in mass production.

The forgoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A fingerprint sensor module, comprising:
   a lens, a top surface and a bottom surface of the lens being planes, the lens defining at least one first area and a second area;
   a filter disposed under the lens, the filter being corresponding to the first area of the lens for reflecting a first fingerprint image corresponding to the first area;
   a first reflector disposed under the lens, the first reflector being corresponding to the second area of the lens for reflecting a second fingerprint image corresponding to the second area;
   an image capturing module for capturing the first fingerprint image corresponding to the first area and reflected by the filter, and the second fingerprint image corresponding to the second area and reflected by the first reflector, the filter being disposed between the first reflector and the first image capturing module, the first fingerprint image corresponding to the first area being reflected by the filter to be captured by the image capturing module, and the second fingerprint image corresponding to the second area being reflected by the first reflector and then penetrating through the filter to be captured by the image capturing module; and
   at least one first light source for providing the needed light source at the time of the image capturing module capturing the fingerprint image.

2. The fingerprint sensor module as claimed in claim 1, wherein a light path between the first area and the image capturing module defines as a first light path, the first light path between the filter and the image capturing module is reflected by at least one second reflector.

3. The fingerprint sensor module as claimed in claim 2, wherein the filter is the polarizing beam splitter, the fingerprint sensor module further includes a polarization rotator and a polarization analyzer, the polarization analyzer is located in front of the image capturing module, the first light path penetrates through the polarization rotator.

4. The fingerprint sensor module as claimed in claim 1, wherein the filter is a polarizing beam splitter or a dichroic filter, or a filter of reflecting some light rays and some other light rays penetrating therethrough.

5. The fingerprint sensor module as claimed in claim 1, wherein the image capturing module is a zoom lens image capturing module or an auto-focus image capturing module.

6. The fingerprint sensor module as claimed in claim 1, wherein the first light source is replaced by at least one second light source and at least one third light source, the second light source irradiates the first area, and the third light source irradiates the second area, the colors of the second light source and the third light source are different.

7. The fingerprint sensor module as claimed in claim 1, wherein the first light source is replaced by an infrared light source, the infrared light source is disposed under the bottom surface of the lens, and the image capturing module is an infrared camera.

8. The fingerprint sensor module as claimed in claim 1, wherein at least one fourth light source is disposed to a periphery of a top of the lens.

9. The fingerprint sensor module as claimed in claim 1, wherein at least one near-infrared light source is disposed under the bottom surface of the lens.

10. The fingerprint sensor module as claimed in claim 1, wherein the first light source is disposed to one side of the lens, the first light source irradiates the lens from the side of the lens adjacent to the first light source.

11. The fingerprint sensor module as claimed in claim 1, wherein the first fingerprint image corresponding to the first area and the second fingerprint image corresponding to the second area captured by the image capturing module will generate the same characteristic areas.

* * * * *